United States Patent Office 3,689,450
Patented Sept. 5, 1972

3,689,450
METHOD OF PREPARING SEALANTS FROM POLYBUTADIENE AND MERCAPTO HYDROXY COMPOUNDS
Paul F. Warner, Phillips, Tex., assignor to Phillips Petroleum Company
No Drawing. Filed Oct. 29, 1970, Ser. No. 85,291
Int. Cl. C08f 21/04, 27/06
U.S. Cl. 260—23.7 M    7 Claims

ABSTRACT OF THE DISCLOSURE

A method for preparing adducts of polybutadiene and mercapto hydroxy compounds having good adhesive properties through the reaction of mercapto hydroxy compounds with liquid polybutadiene under the influence of a free radical generator, wherein said adducts are useful as the base material in sealants, adhesives, plasticizers, paints, and the like.

---

This invention relates to a method for preparing sealants from adducts of polybutadiene and mercapto hydroxy compounds having good adhesive properties. In another aspect, this invention relates to a method for preparing adducts of polybutadiene and mercapto hydroxy compounds for use as base materials in the manufacture of sealants, caulking compounds and the like.

Many compositions or sealants which can be converted to rubbery solids under mild conditions of cure are of interest where products are desired having joints or seams therein which must be watertight, gastight, or resistant to hydrocarbon liquids. A particularly important application for sealants is found in the aircraft industry where efficient caulking of aluminum seams is required in the fabrication of fuel cells or bunkers. Such sealants are used along the seams joining the aluminum sheet stocks and in holes where rivets are to be placed. Sealants used in such applications must be flexible over a wide temperature range, resistant to hydrocarbon solvents and capable of being easily applied. Such sealants can also be used for the glass-to-metal seal in the windows of aircrafts. Similarly, sealants or caulking compounds are used in the building industry to seal around door ad window frames.

An object of the present invention is to provide a method for producing an adduct of polybutadiene and a mercapto hydroxy compound having adhesive properties which can be utilized as caulking compounds, putty compositions, sealant compounds, and the like.

The method of my invention is concerned with the use of sulfur compounds for producing solid materials from liquid diene polymers. My invention involves the reaction of liquid polybutadiene with mercapto hydroxy compounds wherein resinous adducts are obtained. In accordance with my invention, useful sealants and caulking compounds are produced from the aforementioned adducts, wherein the adducts have pendant hydroxyhydocarbylthio groups along the polymer chain. These adducts of polybutadiene and mercapto hydroxy compounds can be used directly as sealants or caulking compounds or further utilized in combination with appropriate filler materials, plasticizers, driers, curing agents and the like. The putty or sealant materials produced by the method of my invention have flow characteristics which permit application to a solid surface by means of a knife or caulking gun. These materials also exhibit good adhesion to surfaces such as metal, wood, glass and the like, even when immersed in solvents. They also have high creep resistance so that the undesirable flow or creep is minimized when the materials are applied to vertical surfaces. By proper control of the aforementioned compounding ingredients it is possible to prepare compositions of any desired consistency for application as well as to control length of time necessary for the setting up of the composition. Furthermore, the compositions prepared by the method of my invention do not dry out and cake with age or show appreciable shrinkage, and remain somewhat flexible over a long and useful life.

The liquid polybutadiene should have a number average molecular weight as determined by osmometry of about 1000–10,000, preferably about 1500–3000, and can be prepared by methods known in the art. The mercapto hydroxy compounds can be represented by the formula HSROH where R is selected from divalent saturated hydrocarbon radicals having 2 to about 10 carbon atoms and divalent aromatic hydrocarbon radicals having 6 to about 10 carbon atoms. Examples of some mercapto hydroxy compounds which can be employed include 2-mercaptoethanol, 3-mercapto-1-propanol, 2-methyl-4-mercapto-1-butanol, 5-mercapto-2-hexanol, 10-mercapto-1-decanol, 4-mercaptocyclohexanol, 2-methyl-3-mercaptocyclopentanol, 2-(mercaptomethyl)cyclooctanol, 4-mercaptophenol, 2-mercapto-1-naphthol, 2-mercapto-m-cresol, 3-(mercaptomethyl)phenol, and the like, and mixtures thereof.

The ratio of mercapto hydroxy compound to liquid polybutadiene generally will be such as to provide about 0.2–4, preferably 0.8–2, molecules of mercapto hydroxy compound for each olefinic double bond in the polybutadiene, i.e., for each unit in the polybutadiene derived from a single monomeric butadiene molecule. There should be present a free radical generator such as ultraviolet light or a chemical initiator. Suitable chemical initiators are known in the art, some examples being alkyl peroxides, acyl peroxides, alkyl hydroperoxides, azo compounds, and aralkyl peroxides. Some specific examples of chemical initiators include di-tert-butyl peroxide, benzoyl peroxide, dicumyl peroxide, tert-butyl hydroperoxide, azobisisobutyronitrile, and acetyl peroxide. Chemical initiators, when used, are employed in minor amounts, e.g., from about 0.1 to about 5 weight percent based on the combined weight of the polybutadiene and mercapto hydroxy compound. Although the reaction temperature can vary over a wide range, it generally will be within the range of about 20 to about 250° F., preferably 50 to 150° F. The reaction time can vary considerably, depending in part on the reaction temperature, but generally will be within the range of about 10 minutes to 1 week, preferably 2 hours to 3 days. If desired, a solvent such as an alcohol or an aromatic hydrocarbon can be employed. The pressure need be only sufficient to maintain the solvent and/or mercapto hydroxy compound substantially in the liquid phase. The adduct of the polybutadiene and mercapto hydroxy compound can be isolated by conventional techniques, e.g., by evaporation of solvent and/or excess mercapto hydroxy compound.

Although the adduct of polybutadiene and mercapto hydroxy compound can be used directly as a sealant or caulking compound, the adduct preferably is first compounded with other ingredients to provide a product having improved characteristics. Thus, it is desirable that there be added one or more fillers such as calcium carbonate, titanium dioxide, silica, carbon black, zinc sulfide, calcium silicate, hydrated alumina, and the like. Plasticizers such as soybean oil and dibutyl phthalate can be added. Driers such as metal naphthenates, e.g., cobalt naphthenate, can be added, as can curing agents such as sulfur and peroxides. The consistency of the sealant or caulking agent can be adjusted by the addition of solvents such as tetrahydrofuran, isopropyl alcohol, monomethyl ether of ethylene glycol, and dimethyl sulfoxide, or combinations of such solvents, or combinations of such solvents with other solvents in which the adduct is of lower solubility, e.g., heptane, cyclohexane, benzene, xylenes, acetone, and the like. Other additives such as antioxidants, dyes, pigments, and the like can be added.

By the process of this invention sealant and caulking compositions exhibiting good low temperature flexibility, good adhesion, and good stability under exposure to ultraviolet light can be prepared as shown in the following examples and tables.

EXAMPLE I

An adduct of liquid polybutadiene and 2-mercaptoethanol was prepared by irradiating, in a polyethylene pipe 3 inches inside diameter and 45 inches long with a 40-watt fluorescent bulb mounted through the pipe and sealed at the end with O-rings, a mixture of 0.904 pound of liquid polybutadiene and 2.600 pounds of 2-mercaptoethanol in 4.489 pounds of a 1:1 by weight mixture of isopropyl alcohol and benzene. The liquid polybutadiene had a molecular weight of 2110, an iodine number of 415, and a structure which was 43.5 percent trans, 39.7 percent cis, and 16.8 percent vinyl. The 2-mercaptoethanol was employed in an amount such as to provide two molecules of 2-mercaptoethanol for each olefinic double bond present in the polybutadiene, based on the polybutadiene possessing one olefinic double bond in each unit derived from a single molecule of butadiene monomer. Although the reaction was essentially complete within 48 hours, it was permitted to take place at 70–98° F. over a period of 144 hours, during which time the mercaptan sulfur content of the reaction mixture was determined at intervals as specified below.

| Reaction time, hr. | Temperature,° F. | Mercaptan sulfur, wt. percent |
|---|---|---|
| 0 | 70 | 12.13 |
| 1 | 81 | 12.10 |
| 3 | 92 | a 12.17 |
| 6 | 98 | 10.40 |
| 24 | 90 | 9.57 |
| 48 | 90 | 8.14 |
| 96 | 90 | 8.14 |
| 144 | 90 | 8.19 | a At this time there was initiated the introduction of a small trickle of air at the bottom of the reactor to provide agitation.

The adduct of polybutadiene and 2-mercaptoethanol was isolated from 6.687 pounds of the reaction mixture by subjecting the mixture to a kettle temperature of 300° F. at 50 mm. Hg to remove substances, followed by further removal of additional volatile material by heating the residue at less than 1.0 mm. Hg pressure in a rotary evaporator in a bath maintained at 200–245° F. The resulting residual product, the adduct of polybutadiene and 2-mercaptoethanol, weighed 1.929 pounds and had the following properties.

| | |
|---|---|
| Total sulfur, wt. percent | 17.2 |
| Hydroxyl content, wt. percent | 11.7 |
| Color, Gardner | 7 |
| Softening point, Ring and Ball, ° F. | a 124 |
| Viscosity at 160° F., poise | 3450 |
| Viscosity at 206° F., poise | 600 | a ASTM D36–62T.

The adduct was soluble in dimethyl sulfoxide, monomethyl ether of ethylene glycol, isopropyl alcohol, pyridine, acetic acid, and 2-mercaptoethanol.

EXAMPLE II

A sealant formulation was prepared from the above adduct of polybutadiene and 2-mercaptoethanol. A control sealant formulation was prepared similarly except that instead of the adduct of polybutadiene and 2-mercaptoethanol there was used a specimen of the polybutadiene which had been employed as a reactant in the preparation of the adduct. Although there was a slight difference in the amount of solvent employed in the two formulations, this slight difference would not alter significantly the results obtained in the subsequent tests. The sealant formulations and test results are shown in the following table.

| | A | B |
|---|---|---|
| Formulations (in parts by weight): a | | |
| 2-mercaptoethanol-polybutadiene adduct | 100 | |
| Polybutadiene | | 100 |
| Calcium carbonate | 125 | 125 |
| Titanium dioxide | 10 | 10 |
| Fumed silica | 5 | 5 |
| Refined soybean oil | 7.2 | 7.2 |
| Cobalt naphthenate (6 wt. percent Co) | 0.1 | 0.1 |
| Tetrahydrofuran | 35 | 30 | a Mixed in a Baker-Perkins mixer.

The sealant formulations of this invention can also be compounded with fillers selected from carbon black, zinc sulfide, calcium silicate, and hydrated alumina; plasticizers, for example, dibutyl phthalate; driers selected from metal naphthenates; and peroxide curing agents.

| Test results: | | |
|---|---|---|
| Low temperature flexibility a | Flexible | Surface cracked. |
| Adhesion to aluminum b | Good | Good. |
| Condition after 350 hours exposure to ultraviolet light. c | Surface smooth and white. | Surface hard, easily cracked, and light yellow. | a Sealant spread on a thin aluminum plate, allowed to dry, cooled to 0° F.
b Sealant spread between aluminum and canvas, then tested after 15 days at room temperature.
c Exposure of sealant on aluminum at 140–150° F. and 50% relative humidity in an Atlas Weather-O-meter.

Thus, sealant formulation A comprising the adduct of liquid polybutadiene and 2-mercaptoethanol exhibited good low temperature flexibility, good adhesion to aluminum, and good stability to ultraviolet light. The low temperature flexibility and stability to ultraviolet light were gerater than those exhibited by the liquid polybutadiene prior to adduct formation.

As will be evident to those skilled in the art, various modifications of this invention can be made or followed in the light of this disclosure without departing from the spirit or scope thereof.

I claim:

1. A method for preparing sealants having adhesive properties, comprising: reacting mercapto hydroxy compounds represented by the formula HSROH where R is selected from divalent saturated hydrocarbon radicals having 2 to about 10 carbon atoms and divalent aromatic hydrocarbon radicals having 6 to about 10 carbon atoms with liquid polybutadiene having a molecular weight of from about 1000 to about 10,000 in the presence of a free radical generator at a reaction temperature of about 20° F. to about 250° F. wherein the mercapto hydroxy compound and the liquid polybutadiene are contacted in a ratio of from about 0.2 to about 4 molecules of the mercapto hydroxy compound for each olefinic double bond in the liquid polybutadiene.

2. A method according to claim 1 wherein the mercapto hydroxy compound is 2-mercaptoethanol and the free radical generator is ultraviolet light.

3. A method according to claim 1 wherein the mercapto hydroxy compound is 2-mercaptoethanol and the free radical generator is a chemical initiator selected from at least one of alkyl peroxides, acyl peroxides, alkyl hydroperoxides, azo compounds and aralkyl peroxides.

4. A method according to claim 3 wherein the amount of chemical initiator employed is from about 0.1 to about 5 weight percent based on the combined weight of the polybutadiene and mercapto hydroxy compound.

5. A method according to claim 1 wherein the reaction time ranges from about 10 minutes to 1 week.

6. A method according to claim 1 wherein the sealants are compounded with fillers selected from at least one of calcium carbonate, titanium dioxide, silica, carbon black, zinc sulfide, calcium silicate, and hydrated alumina; plasticizers selected from at least one of soybean oil and dibutyl phthalate; driers comprising metal naphthenates; and curing agents selected from at least one of sulfur and peroxides.

7. A method according to claim 1 wherein the sealants are maintained in liquid phase suspension through the use of solvents selected from at least one of tetrahydrofuran, isopropyl alcohol monomethyl ether of ethylene glycol, and dimethyl sulfoxide.

References Cited

UNITED STATES PATENTS

| | | | |
|---|---|---|---|
| 2,556,856 | 6/1951 | Swaney et al. | 260—79.5C X |
| 3,234,188 | 2/1966 | Warner | 260—79.5 UX |
| 3,338,810 | 8/1967 | Warner | 260—79.5 UX |

FOREIGN PATENTS

| | | | |
|---|---|---|---|
| 695,456 | 10/1964 | Canada | 260—79.5 C |

LEWIS T. JACOBS, Primary Examiner

U.S. Cl. X.R.

260—31.8 Z, 37 R, 79.5 R